(12) United States Patent
Wey

(10) Patent No.: US 8,887,697 B2
(45) Date of Patent: Nov. 18, 2014

(54) EFFICIENT COMBUSTION OF HYDROCARBON FUELS IN ENGINES

(76) Inventor: Albert Chin-Tang Wey, Westmont, IL (US)

(*) Notice: Subject to any disclaimer, the term of this patent is extended or adjusted under 35 U.S.C. 154(b) by 450 days.

(21) Appl. No.: 12/806,369

(22) Filed: Aug. 11, 2010

(65) Prior Publication Data

US 2012/0037098 A1 Feb. 16, 2012

(51) Int. Cl.
*F02M 33/00* (2006.01)

(52) U.S. Cl.
USPC .................................. 123/538; 123/DIG. 12

(58) Field of Classification Search
USPC .......................................... 123/538, DIG. 12
See application file for complete search history.

(56) References Cited

U.S. PATENT DOCUMENTS

| | | | |
|---|---|---|---|
| 5,044,346 A * | 9/1991 | Tada et al. | 123/536 |
| 5,139,002 A | 8/1992 | Lynch et al. | |
| 5,632,254 A * | 5/1997 | Kim | 123/538 |
| 6,026,788 A * | 2/2000 | Wey | 123/538 |
| 6,058,914 A * | 5/2000 | Suzuki | 123/538 |
| 6,082,339 A * | 7/2000 | Wey | 123/538 |
| 6,655,324 B2 | 12/2003 | Cohn et al. | |
| 6,779,337 B2 | 8/2004 | Tang et al. | |
| 6,845,608 B2 | 1/2005 | LKlenk et al. | |
| 7,249,598 B1 * | 7/2007 | Richardson | 123/572 |
| 7,290,504 B2 | 11/2007 | Lange | |
| 7,377,269 B1 * | 5/2008 | Lai | 123/538 |
| 7,617,815 B2 * | 11/2009 | Wey | 123/538 |
| 7,721,682 B2 | 5/2010 | Fulton et al. | |
| 2007/0131205 A1 * | 6/2007 | Wang et al. | 123/538 |
| 2007/0163553 A1 * | 7/2007 | Chen | 123/538 |
| 2009/0120416 A1 * | 5/2009 | Wey | 123/538 |
| 2010/0147237 A1 * | 6/2010 | Lee | 123/1 A |

* cited by examiner

*Primary Examiner* — M. McMahon
(74) *Attorney, Agent, or Firm* — IpHorgan Ltd.

(57) ABSTRACT

This invention relates to a system and a method for achieving efficient combustion of hydrocarbon fuels in internal combustion engines to enhance the engine performance with reduced fuel consumption and emissions, comprising at least an infrared radiation source emitting infrared at wavelengths covering at least a portion of 3-20 micrometers wavelength range for exciting the hydrocarbon fuel and a hydrogen source providing hydrogen gas to be burned along with the infrared-excited hydrocarbon fuel in engine cylinder. The hydrocarbon fuel can be any of hydrocarbon-based fuels, including methane, propane, gasoline, ethanol, diesels, biodiesels, and renewable fuels, that are used to power internal combustion engines. The expectation is to provide an effective means of improving hydrocarbon fuel efficiency in engines for better engine performance with increased torque and power, improved fuel economy, and reduced exhaust emissions.

11 Claims, 3 Drawing Sheets

EFFICIENT COMBUSTION OF HYDROCARBON FUELS IN ENGINES

BACKGROUND

1. Field of Invention

This invention relates to a system and a method for achieving efficient combustion of hydrocarbon fuels in internal combustion engines to enhance the engine performance with reduced fuel consumption and emissions comprising at least an infrared radiation source emitting infrared at wavelengths covering at least a portion of 3-20 micrometers wavelength range so that the hydrocarbon fuel can be excited with infrared at said wavelengths before entering engine chamber for combustion and a hydrogen source providing hydrogen gas to be burned along with the infrared-excited hydrocarbon fuel in engine cylinder. The hydrocarbon fuel can be any of gaseous or liquid fuels, such as methane, propane, gasoline, ethanol, diesels, biodiesels, and renewable fuels that are used to power internal combustion engines.

2. Description of Prior Art

In Organic Chemistry photoexciting hydrocarbons with infrared photons shorter than 20 μm (micrometers) in wavelengths for improving fuel conversion efficiency is scientifically predicted. When a photon is absorbed by a molecule, it ceases to exist and its energy is transferred to the molecule in one of vibrational, rotational, electronic, and translational forms. Hydrocarbon molecules are known to be infrared-active and absorb infrared photons in 3-20 μm wavelengths to cause molecular vibrations in stretching and/or bending movement.

After years of research the present inventor discovered the use of infrared radiation at 3-20 μm wavelengths, defined as "mid-infrared" by U.S. NASA but "far infrared" in Japanese convention, for enhancing combustion efficiency of hydrocarbon fuels in internal combustion engines and resulted in the inventions of fuel combustion enhancement devices as disclosed in the U.S. Pat. Nos. 6,026,788, 6,082,339 and 7,617,815.

The present inventor has proven the underlining science of infrared-excitation effect on fuel in a laminar non-premixed counterflow methane-air flame experimentation at Purdue University (West Lafayette, Ind., USA) to help pinpoint the IR-excitation influence on combustion of hydrocarbon fuels. The present inventor further verified in separate engine and vehicle tests that infrared excitation at said wavelengths does help improve engine performance with significant reduction in both fuel consumption and emissions.

Though the device as described in the U.S. Pat. Nos. 6,026,788, 6,082,339 and 7,617,815 by the present inventor worked adequately for both gasoline and diesel engines, the fuel excitation effect became limited in the applications of heavy heavy-duty diesel engines, such as in earth moving equipment, marine vessels, locomotives, or power generators. These applications require irradiating an extensive flow of fuel substance in a very short time interval. In particular, some applications at the extreme end of the spectrum may require the use of heavy oils (e.g. #6 diesels, bunker oils) and to operate at very low engine speeds (e.g. 100 RPM's). These applications impose a limitation upon the efficacy of infrared excitation and raises a challenge to the current infrared-fuel technology.

On the other front, hydrogen ($H_2$) has been considered as an alternate fuel or as an additional fuel to accompany fossil fuels in internal combustion engines, as described in the U.S. Pat. Nos. 5,139,002, 6,655,324, 6,779,337, 6,845,608, 7,290,504, and 7,721,682, for the benefits of reduced engine emissions. There are several advantages of hydrogen for the purported applications, including hydrogen has high speed of flame propagation and it increases the H/C ratio of the entire fuel, just to name a few. Faster combustion of hydrogen fuel or hydrogen-blended conventional fossil fuels in engine becomes closer to constant volume causing an increase of the indicated efficiency, and thus reducing fuel consumption and carbon emissions. Of course, there are also numerous problems associated with hydrogen bi-fuel technology, such as uncontrollable hydrogen self-ignition, intensive combustion knock, and instability of combustion that limit the wide spread of hydrogen technologies.

During the development of IR-fuel technology, the present inventor had realized a collective benefit on the combined use of IR-excitation and hydrogen-addition in the combustion of hydrocarbon fuels for improved fuel efficiency in internal combustion engines, which had not been taught by any of prior arts.

In Quantum Mechanics, the reaction (oxidation) rate W is determined by Arrhenius equation:

$$W = Rke^{-E/RT}$$

where k is a constant, R the universal gas constant, T temperature in Kelvin °K, and E the activation energy required to overcome the activation barrier.

It was recognized early in the study of chemical kinetics that increasing the energy of reactants increased reaction rate W, and it was usually accomplished by simply raising the reaction temperature T. However, in 1930's Evans and Polanyi illustrated the importance of molecular vibrational energy in reaction dynamics and claimed the reactant vibrational energy is the most effective at promoting reaction. Their expectation was that if the vibrational excitations were sufficient to lower the activation barrier of reactants E, substantial rate enhancement would be realized.

Based on Arrhenius equation, it becomes comprehensible why increased reaction rate W was usually accomplished by raising the reaction temperature T in early study of chemical kinetics. It made perfect sense in that time because W increases when T increases. However, it was Evans and Polanyi who discovered an alternate for increased W with a reduced E and suggested increasing reactant vibrational energy would be the most effective means to promote reaction, which can be accomplished by the infrared-excitation effect introduced by the present inventor.

The factor (E/T) can be used as a simple indicator to predict the reaction rate W during combustion. A smaller (E/T) will be always desirable for a higher reaction rate W. As mentioned above, hydrogen has high speed of flame propagation that can increase local temperature T around the flame front in spark ignition (SI) engines or around the diesel fuel spray in compression ignition (CI) engines, while IR-excitation can lower the activation barrier E of hydrocarbon fuels, which makes perfect match for a smaller (E/T) as desired.

In summary, in the aforementioned laminar non-premixed counterflow methane-air flame experimentation the present inventor has proved that the IR-excited hydrocarbon fuels combust faster than regular hydrocarbon fuels, while the existing problems associated with the hydrogen-blended hydrocarbon fuel is on the fact that hydrogen burns faster than conventional hydrocarbon fuels. As such, the addition of IR-excitation effect to current hydrogen bi-fuel technology can decrease heterogeneity of the hydrogen-enriched hydrocarbon combustion. Better homogeneity of the combustible mixture would provide better conditions for the complete combustion process that alleviate aforementioned problems associated with hydrogen bi-fuel technology As described above, the prior art failed to teach the combined use of IR-excitation and hydrogen enriched hydrocarbon combustion in internal combustion engines to improve the engine performance for increased power, reduced fuel consumption, and decreased emissions.

OBJECTS AND ADVANTAGES

Accordingly, one object of this invention is to provide a system and method for achieving efficient combustion of hydrocarbon fuels in internal combustion engines to enhance the engine performance for increased power, improved fuel economy, and reduced exhaust emissions;

Another object of the present invention is to provide a simple, cost-effective hydrocarbon fuel combustion efficiency enhancement system and method that will work on nearly all old and new production engines, no change in engine specifications required.

Also, one object of the present invention is to provide a simple, cost-effective hydrocarbon fuel combustion efficiency enhancement system that will work on all hydrocarbon-based fuels, including any gaseous or liquid fuels such as methane, propane, gasoline, ethanol, diesels, biodiesels, and renewable fuels that are used to power internal combustion engines.

These objectives are achieved by a system and method of the present invention comprising at least an infrared radiation source emitting infrared at wavelengths covering at least a portion of 3-20 micrometers wavelength range to excite hydrocarbon fuel and a hydrogen source providing hydrogen gas to be burned along with the infrared-excited hydrocarbon fuel in engine cylinder.

Other objects, features, and advantages of the present invention will hereinafter become apparent to those skilled in the art from the following description.

DRAWING FIGURES

Figure 1:
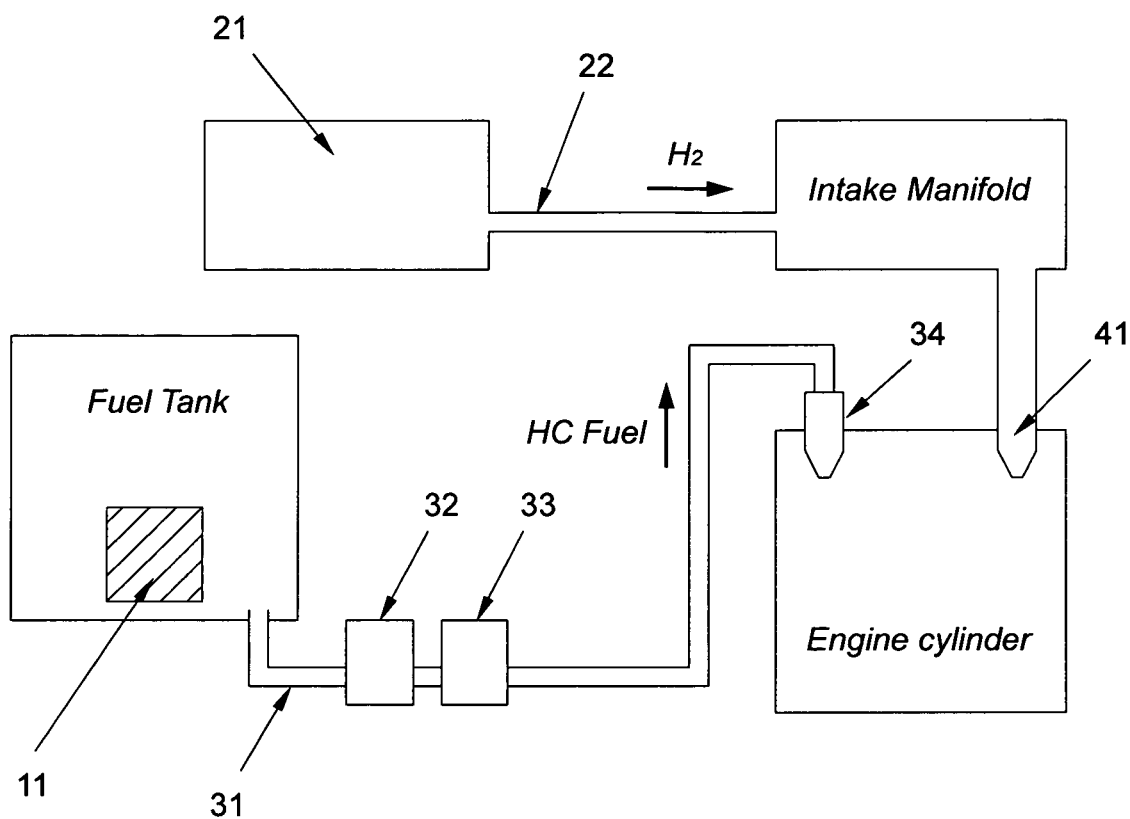
FIG. 1 is a schematic illustration showing one embodiment of the present invention with the infrared radiation source being disposed in the fuel tank and the hydrogen gas from the hydrogen source being inducted with air into engine intake manifold.

| Reference Numerals in Drawings | |
|---|---|
| 11 Infrared radiation source | 21 Hydrogen source |
| 22 Hydrogen delivery means | 23 Hydrogen injector |
| 31 Fuel line | 32 Fuel pump |
| 33 Fuel filter | 34 Fuel injector |
| 35 Add on retrofit | 41 Intake valve |

SUMMARY

In accordance with the present invention a system and method for achieving efficient combustion of hydrocarbon fuels in internal combustion engines to enhance the engine performance with reduced fuel consumption and emissions comprises at least an infrared radiation source emitting infrared at wavelengths covering at least a portion of 3-20 micrometers wavelength range for exciting the hydrocarbon fuel and a hydrogen source providing hydrogen gas to be burned along with the infrared-excited hydrocarbon fuel in engine cylinder. The hydrocarbon fuel can be any of hydrocarbon-based fuels, including methane, propane, gasoline, ethanol, diesels, biodiesels, and renewable fuels, that are used to power internal combustion engines. The expectation is to provide an effective means of improving hydrocarbon fuel efficiency in engines for better engine performance with increased torque and power, improved fuel economy, and reduced exhaust emissions.

DETAILED DESCRIPTION OF THE INVENTION

FIG. 1 shows one embodiment of the present invention with the infrared radiation source 11 being disposed in the fuel tank and the hydrogen gas from the hydrogen source 21 being inducted with air into intake manifold of the engine.

The infrared radiation source 11 may consist of at least one infrared (IR)-emitting ceramic composite that emits infrared at wavelengths covering at least a portion of 3-20 micrometers wavelength. This IR-emitting ceramic composite can be, but not limited to, one of the devices described in the U.S. Pat. Nos. 6,026,788, 6,082,339 & 7,617,815 by the present inventor. The IR radiation source 11 of the present invention can take any shapes, forms, styles, patterns, and in any dimensions, as allowed by practical deployments. The IR radiation source 11 can be disposed on anywhere along the fuel system of the engine, including fuel tanks, lines 31, pumps 32, filters 33, injectors 34, or any add on retrofits 35, and the like. The IR radiation source 11 can be arranged in any way, either in direct contact with hydrocarbon fuel or at proximity of the fuel without direct contact, provided that infrared can penetrate the media. The infrared at said wavelengths can penetrate any nonmetal material.

When retrofitted to the fuel system of an engine, the infrared-emitting ceramic of the IR radiation source 11 can absorb radiation heat from ambience to emit IR photons in said wavelengths. The hydrocarbon molecules in the fuel can absorb a number of IR-photons at assorted wavelengths that match its fundamental and combination vibrational modes to cause molecular vibrations, known as the molecular multiphoton process (MMP). The constituent electrons can climb up the ladder of vibrational states and reach excited states that have a lower activation barrier for reaction. As a result, IR-excited hydrocarbon fuel becomes more combustible and can burn faster in engine cylinders. As stated before, one of the key problems associated with hydrogen-hydrocarbon bi-fuel technology is the heterogeneity between hydrogen gas and the conventional hydrocarbon fuels. For example, in a diesel engine, hydrogen has higher diffusivity and about five-times higher speed of flame propagation than diesel fuel spray. Therefore, the IR-excitation on diesel makes the fuel become more combustible, which can minimize the heterogeneity between hydrogen and the diesel fuel. Better homogeneity of the combustible hydrogen-diesel mixture would provide better conditions for combustion in engine cylinder. This provides the theoretical ground for the present invention.

The hydrogen source 21 can be, but not limited to, a storing means such as cylinder or tank that stores and supplies hydrogen gas or liquefied hydrogen, or a producing means that produces hydrogen from, but not limited to, water electrolysis or fuel reformer. The hydrogen gas provided by the hydrogen source 21 can be either inducted with air into engine intake manifold, directly injected into engine cylinder, or added to the hydrocarbon fuel in the fuel system of the engine. The purpose is to have the hydrogen gas burned along with infrared-excited hydrocarbon fuel in engine cylinder. In addition, the hydrogen can also be produced and combusted in engine cylinder resulting from the combustion of water-emulsified hydrocarbon fuel.

In the embodiment shown in FIG. 1, the hydrogen gas provided by the hydrogen source 21 is inducted with air into engine intake manifold through a hydrogen delivery means 21, while many deployment options may be chosen.

Figure 2:
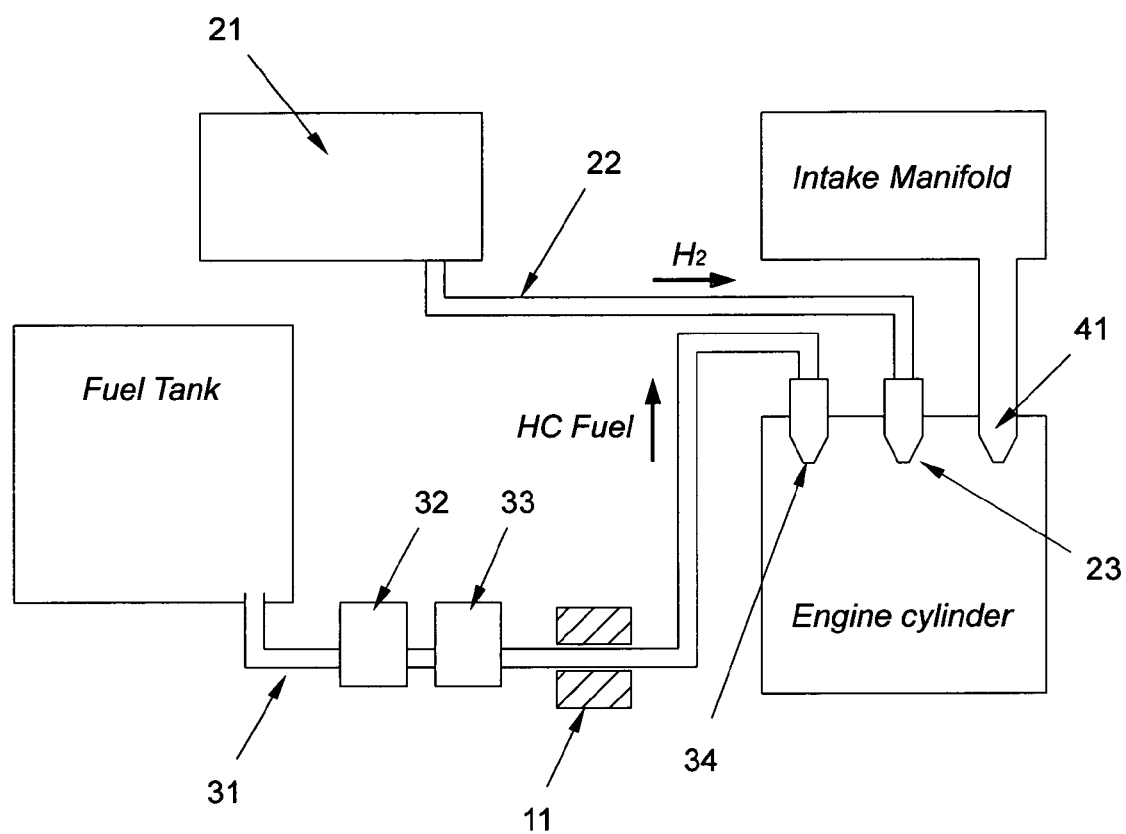
FIG. 2 is a schematic illustration showing another embodiment of the present invention with the infrared radiation source being disposed on exterior of a nonmetal fuel line and the hydrogen gas from the hydrogen source being directly injected into engine cylinder.
Figure 3:
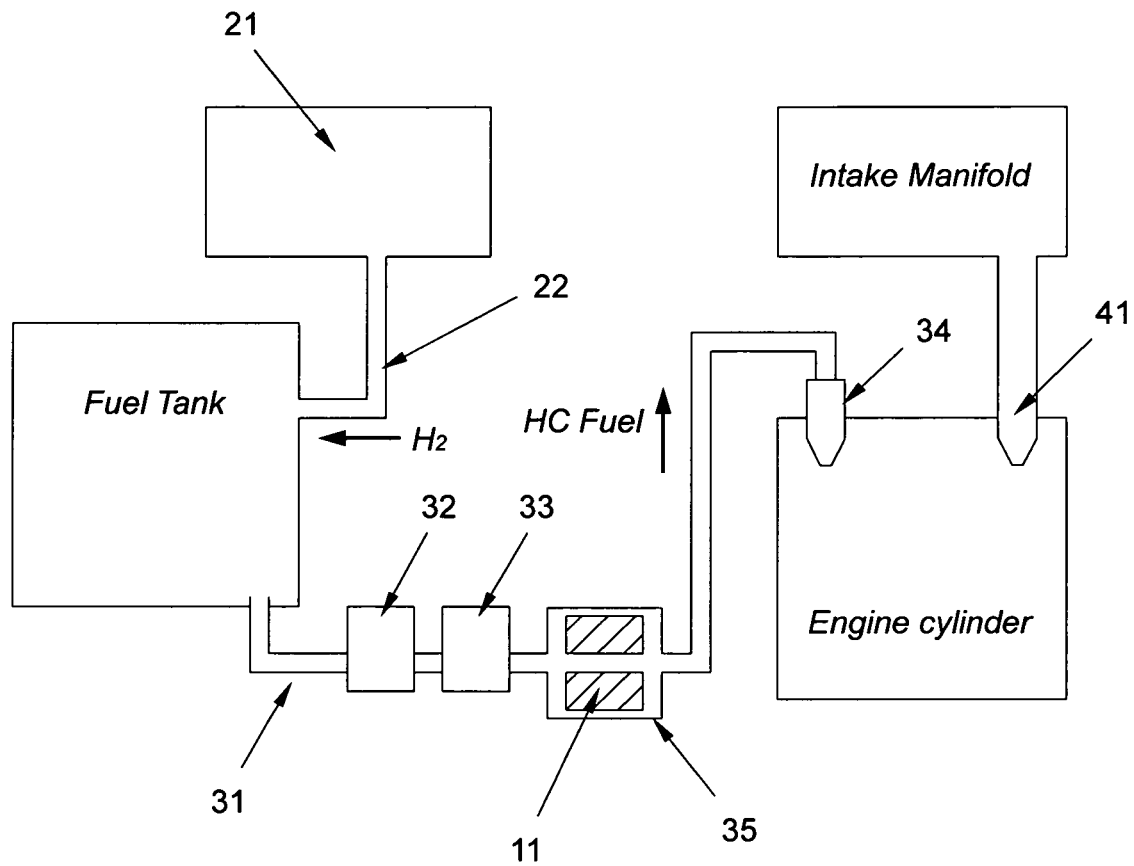
FIG. 3 is a schematic illustration showing another embodiment of the present invention with the infrared radiation source being disposed on interior of an add on retrofit to the fuel line and the hydrogen from the hydrogen source being added to the hydrocarbon fuel in the fuel system of the engine.

FIG. 2 shows another embodiment of the present invention with the infrared radiation source 11 is chosen to be disposed on exterior of a nonmetal fuel line and the hydrogen gas from hydrogen source 21 is chosen to be directly injected into engine cylinder by an injector 23. Additionally, FIG. 3 shows another embodiment of the present invention with the infrared radiation source 11 being disposed on interior of an add on retrofit 35 inserted to the fuel line and the hydrogen from hydrogen source 21 being added to and blended with the hydrocarbon fuel in the fuel system of the engine, or the fuel tank in this case.

Though only three exemplary embodiments of the present invention are presented herein, there are numerous ways of deployment can be chosen depending on the selections of infrared radiation source 11 and hydrogen source 21 and where and how to deploy them.

In applications, the effect of hydrogen addition to convention hydrocarbon fuel for enriching the hydrocarbon combustion may vary, depending on the amount of hydrogen added and the type of engines and hydrocarbon fuels used, which needs be sorted out experimentally. Nevertheless, no modification on engines will be required, even though some engine operation parameters may be optimized to obtain the best results possible.

Conclusion, Ramifications, and Scope

According to the present invention a system and method for achieving efficient combustion of hydrocarbon fuels in internal combustion engines to enhance the engine performance with reduced fuel consumption and emissions comprises at least an infrared radiation source emitting infrared at wavelengths covering at least a portion of 3-20 micrometers wavelength range for exciting the hydrocarbon fuel and a hydrogen source providing hydrogen gas to be burned along with the infrared-excited hydrocarbon fuel in engine cylinder.

The invention has been described above. Obviously, numerous modifications and variations of the present invention are possible in light of the above teachings. Such variations are not to be regarded as a departure from the spirit and scope of the invention and all such modifications as would be obvious to one skilled in the art are intended to be included within the scope of the following claims.

I claim:

1. A system for achieving efficient combustion of hydrocarbon fuel in an internal combustion engine, said system consisting of at least
   (a) an infrared radiation source that emits infrared at wavelengths covering at least a portion of 3-20 micrometers wavelength range; said infrared radiation source being disposed in contact with or at proximity of the hydrocarbon fuel so that the fuel can be excited by said infrared prior to combustion;
   (b) a hydrogen source that provides hydrogen gas to be burned along with the infrared-excited hydrocarbon fuel in engine cylinder, the hydrogen gas is provided in an amount proportional to the type of engine and hydrocarbon fuel used, in a range of 5-15% in energy fraction;
   (c) a valve for introducing the hydrogen gas into the engine cylinder during an induction stroke or a compression stroke; and
   (d) an injector for introducing the infrared-excited hydrocarbon fuel into the engine cylinder near the end of a compression stroke,
   whereby the infrared-excited hydrocarbon fuel is injected and diffused into the compressed and heated homogeneous mixture of hydrogen gas and air in the engine cylinder, creating a condition for the simultaneous burning of the hydrogen gas and the infrared-excited hydrocarbon fuel and for increased power and reduced combustion knock and nitric oxide emission.

2. A system according to claim 1 wherein said infrared radiation source consists of at least one ceramic composite that emits infrared at said wavelengths.

3. A system according to claim 1 wherein said infrared radiation source is placed at exterior of a nonmetal fuel line or accessory of the engine.

4. A system according to claim 1 wherein said infrared radiation source is disposed on inside of an accessory in the fuel systems of the engine, said accessory being tanks, pumps, lines, filters, injectors, add-on retrofits, and the like.

5. A system according to claim 1 wherein said hydrogen source is a hydrogen storing means.

6. A system according to claim 1 wherein said hydrogen source is a hydrogen producing means.

7. A system according to claim 1 wherein said hydrogen gas is inducted with air into engine intake manifold.

8. A system according to claim 1 wherein said hydrogen gas is directly injected into engine cylinder.

9. A system according to claim 1 wherein said hydrogen gas is added to the hydrocarbon fuel in the fuel system of the engine.

10. A system according to claim 1 wherein said hydrogen gas is produced and combusted in engine cylinder resulting from the combustion of water-emulsified hydrocarbon fuel.

11. A method for achieving efficient combustion of hydrocarbon fuel in an internal combustion engine, comprising:
   providing hydrocarbon fuel to be used for powering the engine,
   exciting said hydrocarbon fuel with infrared at wavelengths covering at least a portion of 3-20 micrometers wavelength range, and
   providing hydrogen gas in an amount proportional to the type of engine and hydrocarbon fuel used, in range of 5-15% in energy fraction,
   introducing the hydrogen gas into the engine cylinder during an induction stroke or a compression stroke,
   introducing the infrared-excited hydrocarbon fuel into the engine cylinder near the end of a compression stroke,
   injecting and diffusing the infrared-excited hydrocarbon fuel into the homogeneous mixture of said hydrogen gas and air in the engine cylinder, and
   burinq the substantially homogenous mixture of infrared-excited hydrocarbon fuel and hydrogen gas so that the hydrogen gas and the infrared-excited hydrocarbon fuel is ignited substantially simultaneously.

* * * * *